US011763253B2

(12) United States Patent
Simsek-Ege et al.

(10) Patent No.: US 11,763,253 B2
(45) Date of Patent: Sep. 19, 2023

(54) INVENTORY MANAGEMENT (71) Applicant: Micron Technology, Inc., Boise, ID (US)

(72) Inventors: Fatma Arzum Simsek-Ege, Boise, ID (US); Gitanjali T. Ghosh, Boise, ID (US); Yixin Yan, Boise, ID (US); Rosa M. Avila-Hernandez, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 38 days.

(21) Appl. No.: 16/997,785

(22) Filed: Aug. 19, 2020

(65) Prior Publication Data

US 2022/0058570 A1 Feb. 24, 2022

(51) Int. Cl.
G06Q 10/08 (2023.01)
G06Q 10/087 (2023.01)
G06N 20/00 (2019.01)

(52) U.S. Cl.
CPC ........... *G06Q 10/087* (2013.01); *G06N 20/00* (2019.01)

(58) Field of Classification Search
CPC combination set(s) only.
See application file for complete search history.

(56) References Cited

U.S. PATENT DOCUMENTS

| 10,713,614 | B1 | 7/2020 | Manyam et al. |
| 10,732,026 | B1 | 8/2020 | Danenberg et al. |
| 10,736,569 | B2 | 8/2020 | Bogdanovich et al. |
| 10,740,814 | B2 | 8/2020 | Gandhi et al. |
| 2011/0017693 | A1 | 1/2011 | Thomas et al. |
| 2015/0041537 | A1 | 2/2015 | Gentile et al. |
| 2015/0041616 | A1 | 2/2015 | Gentile et al. |
| 2015/0048161 | A1 | 2/2015 | Gentile et al. |
| 2018/0058739 | A1* | 3/2018 | Zou .......... F25B 49/00 |
| 2019/0057566 | A1 | 2/2019 | Mlynarczyk et al. |
| 2019/0147396 | A1* | 5/2019 | Bohling .................... G06N 5/04 705/28 |
| 2019/0148170 | A1* | 5/2019 | Hussain .............. H01L 23/5389 361/749 |
| 2019/0236527 | A1* | 8/2019 | Bhaumik ............. G06Q 10/087 |

* cited by examiner

Primary Examiner — Peter Ludwig
Assistant Examiner — Reva R Moore
(74) Attorney, Agent, or Firm — Brooks, Cameron & Huebsch, PLLC (57) ABSTRACT Methods, apparatuses, and systems associated with inventory management are described. Examples can include receiving at a processor first signaling from a first sensor device configured to monitor the interior of a first enclosure and receiving at the processor second signaling from a second sensor device configured to monitor the interior of a second enclosure. Examples can include writing from the processor to a storage device coupled to the processor data that is based at least in part on a combination of the first and second signaling, identifying a quantity or amount of at least one item in the first enclosure and at least one item in the second enclosure, and transmitting third signaling when the quantity or amount of the at least one item in the first enclosure or the at least one item in the second enclosure is less than a threshold value.

20 Claims, 6 Drawing Sheets

674 — RECEIVING AT A PROCESSOR FIRST SIGNALING FROM A FIRST SENSOR DEVICE THAT COMPRISES AT LEAST ONE OF AN IMAGE SENSOR, A TEMPERATURE SENSOR, A SONIC SENSOR, A PRESSURE SENSOR, A PROXIMITY SENSOR, OR ANY COMBINATION THEREOF, THE FIRST SENSOR DEVICE CONFIGURED TO MONITOR THE INTERIOR OF A FIRST ENCLOSURE

676 — RECEIVING AT THE PROCESSOR SECOND SIGNALING FROM A RADIO IN COMMUNICATION WITH A SECOND SENSOR DEVICE THAT COMPRISE AT LEAST ONE OF AN IMAGE SENSOR, A TEMPERATURE SENSOR, A SONIC SENSOR, A PRESSURE SENSOR, A PROXIMITY SENSOR, OR ANY COMBINATION THEREOF, THE SECOND SENSOR CONFIGURED TO MONITOR THE INTERIOR OF A SECOND ENCLOSURE

678 — WRITING FROM THE PROCESSOR TO A STORAGE DEVICE COUPLED TO THE PROCESSOR DATA THAT IS BASED AT LEAST IN PART ON A COMBINATION OF THE FIRST AND SECOND SIGNALING

680 — IDENTIFYING AT THE PROCESSOR OR ANOTHER PROCESSOR A QUANTITY OR AMOUNT OF AT LEAST ONE ITEM IN THE FIRST ENCLOSURE AND AT LEAST ONE ITEM IN THE SECOND ENCLOSURE BASED AT LEAST IN PART ON THE DATA WRITTEN TO THE STORAGE DEVICE

682 — TRANSMITTING THIRD SIGNALING VIA THE RADIO WHEN THE QUANTITY OR AMOUNT OF THE AT LEAST ONE ITEM IN THE FIRST ENCLOSURE OR THE AT LEAST ONE ITEM IN THE SECOND ENCLOSURE IS LESS THAN A THRESHOLD VALUE

INVENTORY MANAGEMENT

TECHNICAL FIELD

The present disclosure relates generally to apparatuses, systems, and methods associated with inventory management.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

Memory devices can be coupled to another device (e.g., a computing device, a processing resource, etc.) to store data, commands, and/or instructions for use by the device while the computer or electronic system is operating. For example, data, commands, and/or instructions can be transferred between the other device and the memory device(s) during operation of a computing or other electronic system.

A package can be a casing containing one or more semiconductor devices or integrated circuits. Individual components can be fabricated before being packaged. The package can be connected to an external environment, such as printed circuit board, via leads such as lands, balls, or pins, among others.

DETAILED DESCRIPTION

Apparatuses, systems, and methods related to inventory management are described. Inventory includes business and personal inventory. For instance, business inventory includes the goods and materials that a business holds for the ultimate goal of resale (or repair). Personal inventory includes goods and materials held for personal use that may or may not be consumed. Inventory management includes specifying the shape and placement of stocked goods (e.g., how to store inventory), determining when more goods may be needed, and determining when and how to order or restock the goods, among others. For instance, inventory can include work within the process of production and/or work that occurs prior to completion of production and/or departure from a facility (e.g., in a manufacturing environment). Inventory may be located or managed at different locations within a location (e.g., facility, office, home, etc.) or within multiple locations of a supply network to precede the regular and planned course of production and stock of materials.

Examples of the present disclosure can improve inventory management efficiency by improving communication between different locations associated with the inventory management. Apparatuses can be placed in different locations to collect and manage inventory information associated with their respective location. The apparatuses can communicate with one another to combine and share the inventory information and perform actions based on the combined/shared information. For instance, actions can include recommendations on inventory contents, ordering of inventory that is below a particular threshold, tracking expiration dates, etc. This can result in increased efficiency and reduced costs associated with business and personal inventory, for instance.

Examples of the present disclosure can include receiving at a processor first signaling from a first sensor device that comprises at least one of an image sensor, a temperature sensor, a sonic sensor, a pressure sensor, a proximity sensor, or any combination thereof, the first sensor device configured to monitor the interior of a first enclosure and receiving at the processor second signaling from a radio in communication with a second sensor device that comprise at least one of an image sensor, a temperature sensor, a sonic sensor, a pressure sensor, a proximity sensor, or any combination thereof, the second sensor configured to monitor the interior of a second enclosure.

Examples can further include writing from the processor to a storage device coupled to the processor data that is based at least in part on a combination of the first and second signaling, identifying at the processor or another processor a quantity or amount of at least one item in the first enclosure and at least one item in the second enclosure based at least in part on the data written to the storage device, and transmitting third signaling via the radio when the quantity or amount of the at least one item in the first enclosure or the at least one item in the second enclosure is less than a threshold value.

Other examples of the present disclosure can include a system including a first apparatus located in a first location and a second apparatus located in a second location and communicatively coupled to the first apparatus. The first apparatus can include a first sensor device located within the interior of the first location. The first apparatus can include a first processor communicatively coupled to the first sensor device, and the processor can receive first signaling from the first sensor and write to a storage device coupled to the first processor a first data set that is based at least in part on the first signaling.

The first apparatus can further include a first controller coupled to the first processor and configured to track inventory information associated with the first location based at least in part on the first data set written to the storage device and communicate the inventory information associated with the first location to the second apparatus.

The second apparatus can include a second sensor device located within the interior of the second location. The second apparatus can include a second processor communicatively coupled to the second sensor device, and the processor can receive second signaling from the second sensor and write to a storage device coupled to the second processor a second data set that is based at least in part on the second signaling.

The second apparatus can further include a second controller coupled to the second processor and configured to track inventory information associated with the second location based at least in part on the first data set written to the storage device, communicate the inventory information associated with the second location to the second apparatus, and request inventory from the first location based on the communicated inventory information associated with the first location and the second location.

Yet other examples of the present disclosure can include an apparatus including a sensor device and a camera device configured to monitor a location in which the apparatus is located, a storage device configured to store the inventory information, and an access device configured to allow access the inventory information. The apparatus can include a processor communicatively coupled to the access device and configured to receive first signaling from the sensor device and second signaling from a communication device of the apparatus in communication with a second sensor device configured to monitor a different location. The apparatus can include a storage device configured to receive and store inventory information written to the storage device from the processor that is based at least in part on a combination of the first and the second signaling.

The apparatus can further include an access device configured to allow access to the inventory information, a controller communicatively coupled to the processor and configured to track the inventory information and manage the inventory information and inventory information associated with the different location.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 102 can reference element "02" in FIG. 1, and a similar element can be referenced as 202 in FIG. 2. Multiple analogous elements within one figure may be referenced with a reference numeral followed by a hyphen and another numeral or a letter. For example, 310-1 may reference element 10-1 in FIGS. 3 and 310-2 may reference element 10-2, which can be analogous to element 10-1. Such analogous elements may be generally referenced without the hyphen and extra numeral or letter. For example, elements 310-1 and 310-2 may be generally referenced as 310. As used herein, designators such as "N", "M", etc., particularly with respect to reference numerals in the drawings, indicate that a number of the particular feature so designation can be included. It is also to be understood that the terminology used herein is for the purpose of describing particular embodiments only and is not intended to be limiting.

As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Some examples of the present disclosure include inventory management apparatuses, systems, and methods that allow for managing inventory and communicating inventory information between and among locations. For instance, inventory information in a first location can be shared with a second location, and vice versa. Inventory at both the first location and second location can be managed together to improve efficiency and lower costs by reducing waste and improving replenishment of supplies, for instance.

Figure 1:
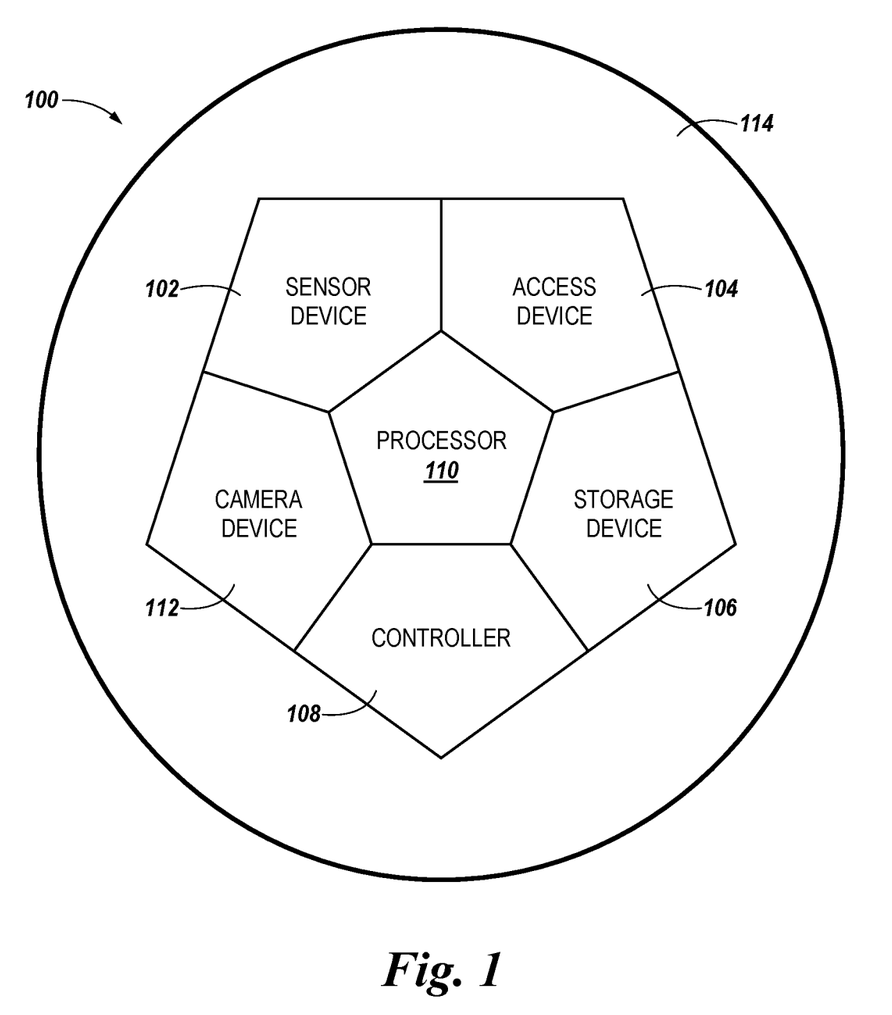
FIG. 1 is a diagram of an example apparatus having a processor, a controller, and a sensor device thereon in accordance with a number of embodiments of the present disclosure.

FIG. 1 is a diagram of an example apparatus 100 (e.g., a package) having a processor 110, a controller 108, and a sensor device 102 thereon in accordance with a number of embodiments of the present disclosure. The apparatus 100, in some examples can comprise a flexible polymer material 114 such as a silicon material, among other flexible polymer materials.

The apparatus 100 can include a processor 110, a controller 108, a storage device 106, an access device, 104, a sensor device 102, and a camera device 112. The illustrated elements may be communicatively coupled to some or all of the other elements of the apparatus 100, in some examples. For instance, the processor 110 may be communicatively coupled the access device 104, and the controller 108 may be communicatively coupled to the processor 110, among other couplings of elements of the apparatus 100. "Communicatively coupled," as used herein, can include coupled via various wired and/or wireless connections between devices such that data can be transferred in various directions between the devices. The coupling may not be a direct connection, and in some examples can be an indirect connection.

The sensor device 102 can monitor a location in which the apparatus 100 is located, and the monitoring can include detecting events or changes in the environment and sending the information to other electronics, such as the processor 110. For instance, the sensor device 102 can include a relative humidity (RH) sensor, a temperature sensor, a weight sensor, a light sensor, a pressure sensor, a flow measurement sensor, a chemical sensor, a biosensor, an image sensor, a sonic sensor, a speed sensor, a weather sensor, a pollution sensor, a lighting sensor, a security sensor, a gas sensor, or a combination thereof. Other sensor devices may also be present on the apparatus 100.

The camera device 112 can include an optical instrument used to record images. For instance, the camera device 112 may be a still or video camera device to record and/or track movement of inventory, user behavior, and/or information on inventory packaging (e.g., expiration dates, use-by dates, sell-by dates, products names, product brands, product sizes, etc.), among others.

The access device 104 can be a DRAM device in some examples, and the storage device 106 can be a NAND device in some instances, though examples of the present disclosure are not so limited and may include other volatile and/or non-volatile memory types. The access device 104 can be configured to allow access to the inventory information, which may be, at least in part, stored in the storage device 106. The storage device 106 can be configured to store inventory information. Inventory information can include inventory contents of the location, environmental information associated with the location information (e.g., humidity, temperature, etc.), inventory patterns of the location learned using artificial intelligence (AI), or a combination thereof. Inventory information may also include other information associated with counting, collecting, comparing, etc. inventory such inventory quantity, inventory location, and inventory thresholds (e.g., quantities, temperatures, humidity, dates, etc.), among others.

Inventory patterns, as used herein, can include learned inventory behavior such as how quickly an item is used up, what days of the week or month or year something is used more often, where the most efficient orders come from, which items expire faster than others, how much lead time is needed before ordering an item, which customers order items at which time, determine which items are most likely to become overstocked, etc. AI, as used herein, includes a controller, computing device, or other system to perform a task that normally requires human intelligence. For instance, the controller 108 can perform a task (e.g., tracking inventory patterns) that normally requires human intelligence.

The controller 108 can be coupled to the processor 110 and the storage device 106, and in some examples, the controller 108, the processor 110, and the storage device 106 can make up a combination of hardware and instructions (e.g., machine-readable instructions) for inventory management. The processor 110, in some examples, can receive first signaling from the sensor device 102 and second signaling from a communication device of the apparatus 100 in communication with a second sensor device configured to monitor a different location. As used herein, signaling can include a communication (e.g., a radio signal) that carries data from one location to another. For instance, the first signaling may include environmental or other data associated with the apparatus 100, and the second signaling may include environmental or other data associated with a different location (e.g., a different apparatus).

The processor 110, as used herein, can include a number of processing resources capable of executing instructions stored by a storage device 106. For instance, the processor 110 can include an image processor. The instructions can include instructions stored on the storage device 106 and executable by the processor 110 to implement a desired function (e.g., receive inventory information, manage inventory, etc.). In some examples, the controller 108 is a microcontroller such that the controller 108 is a compact integrated circuit that may include or be communicatively coupled to the processor 210, the storage device 206, and input/output (I/O) peripherals. The storage device 106 can receive and store inventory information written to the storage device from the processor that is based at least in part on a combination of the first and the second signaling. For instance, the inventory information can include an internal temperature of the apparatus 100 received via the first signaling and/or a humidity of a different location received via the second signaling.

In some examples, the controller 108 is configured to track the inventory information and manage the inventory information and the inventory information associated with the different location. For instance, tracking the inventory information can include receiving inventory information from the sensor device 102 (e.g., via the first signaling), camera device 112, and/or another device (e.g., via the second signaling) and analyzing the inventory information. For instance, the controller 108 can track patterns in the inventory information (e.g., certain inventory runs out faster than others, certain inventory is used up on certain days, deliveries happen certain days, and among other patterns and trends), store the tracked inventory information in the storage device 106 and access the inventory information via the access device 104.

Inventory information associated with a different location can be received via a communication device such as a radio, Universal Serial Bus (USB) port, Handheld Device Markup Language (HDML)-enabled device, ethernet portion, wireless network card, Bluetooth device, and/or another device. For instance, a different apparatus in a different location (e.g., different location in a warehouse, different geographical location, etc.) may communicate with the controller 108 inventory information that can be tracked and managed in combination with the inventory information associated with the location of the apparatus 100.

In some examples, managing the inventory information can include the controller 108 configured to share and request inventory updates associated with the location and the different location with a computing device and/or different processor located in the different location and communicatively coupled to the apparatus 100. For instance, some or all of the inventory information gathered and received can be managed and actions can be taken based on the managed inventory information. For instance, if a first location (e.g., wherein the apparatus 100 is located) is below a threshold amount of item A, but a second location (e.g., the different location) has ample supply of item A, sharing of this inventory information between apparatuses in the different locations can result in the second location sending a supply of item A to the first location.

For instance, if the apparatus 100 is located in a restaurant or cafeteria refrigerator, and using the sensor device 102 and the camera device 112, it detects that a particular type of cheese is running low in inventory or has a nearing expiration date, the apparatus 100 can communicate with an apparatus in a different location (e.g., a refrigerator at a supplier of the restaurant or cafeteria) the inventory information. An order can be placed for the particular type of cheese, improving the ordering process and efficiency. In such an example, an alert may be sent to the restaurant, cafeteria, and/or the supplier letting them know of the communication, transaction, or a combination thereof.

In the same example, the sensor device 102 may identify that the cheese is a perishable item with a reduced shelf life.

For instance, the sensor device 102 may identify an approaching expiration date of the cheese or may detect discoloration (e.g., mold) on the cheese and provide a notification to order more cheese or place the order. Examples are not limited to perishable foods and may include non-perishable foods in a restaurant or cafeteria pantry, for instance. In addition, examples herein are not limited to restaurants and cafeterias and may be applied to inventory in different businesses and homes.

Figure 2:
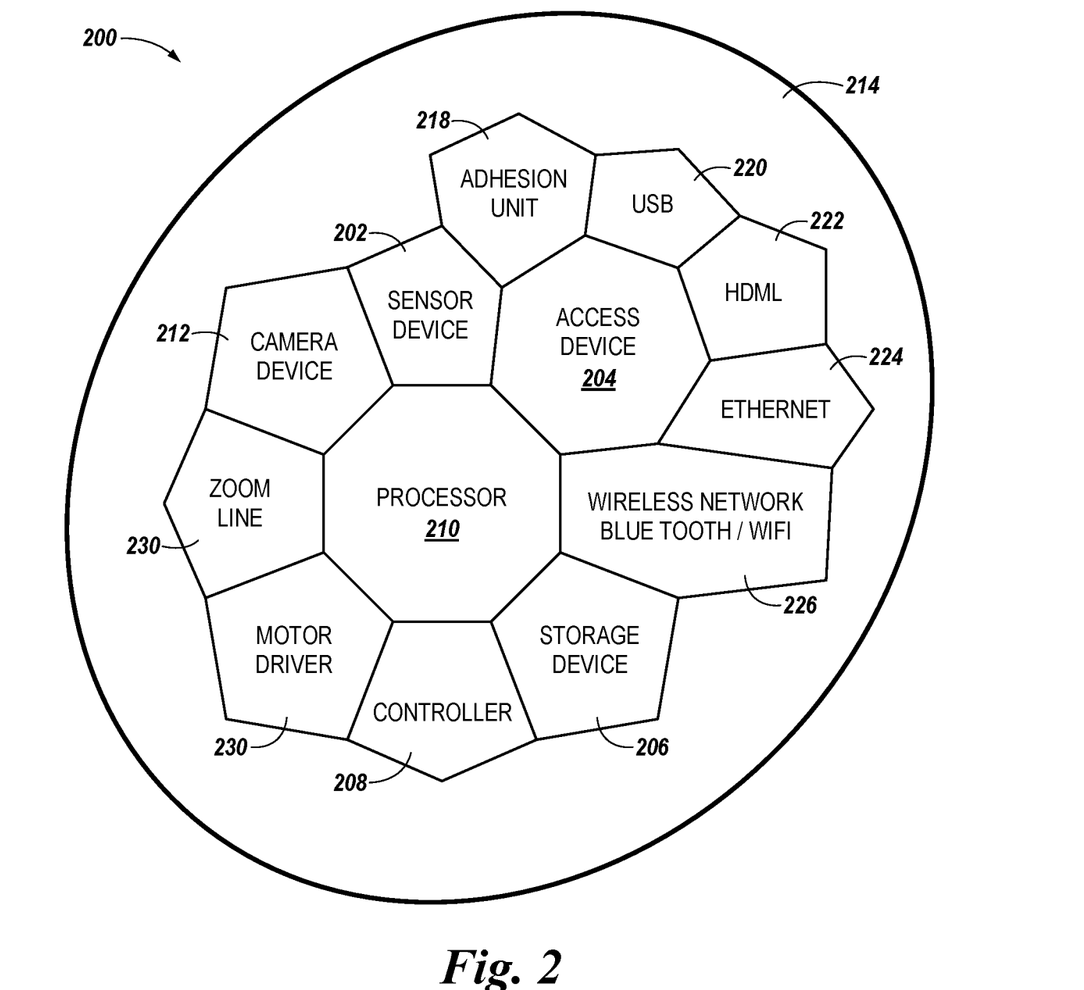
FIG. 2 is another diagram of an example apparatus having a processor, a controller, and a sensor device thereon in accordance with a number of embodiments of the present disclosure.

FIG. 2 is another diagram of an example apparatus 200 (e.g., package) having a processor 210, a controller 208, and a sensor device 202 thereon in accordance with a number of embodiments of the present disclosure. Like the apparatus 100 illustrated in FIG. 1, the apparatus 200 includes a sensor device 202, an access device 204, a storage device 206, a controller 208, a processor 110, and a camera device 212 located on a package of a particular material, for instance a flexible polymer material 214.

Coupled to the camera device 212 is a zoom line 230 and a motor driver 228. The camera device 212 can include or be co-located with, in some instances a zoom line, an ultraviolet (UV) light, a UVC light, an infrared (IR) light, an x-ray device, an optical scanner, or a combination thereof, among others. The motor driver 228 can be a mechanism that uses electrical and mechanical techniques to automatically advance camera film and/or cock a camera shutter. The apparatus may also include a lens motor, a focus motor, a shutter, or a combination thereof to use in associated with the cameral device 212.

In some examples, the apparatus can include a communication device, which can include a device or port to facilitate communication of inventory information or other information. For instance, a communication device may include a USB port 220, an HDML 222, an Ethernet port 224, a wireless card, a wireless network connection, a Bluetooth connection 226, or a combination thereof. Other communication devices or modes of communication such as a radio may be included as a part of the apparatus 200. Inventory information can be communicated, for instance, from the apparatus 200 to a different apparatus and/or computing device.

In some examples, the apparatus 200 includes an adhesion unit 218. The adhesion unit 218 can be used to adhere, hang, or attach the apparatus 200 to something (e.g., a wall, a device, a storage rack, a storage unit, a closet, etc.). For instance, the adhesion unit 218 can be a particular material, hook, tape, etc. that can be attached to a desired surface for tracking inventory information.

In an example, the apparatus 200 can be located in a first location such as a storage unit. The apparatus 200 may be in communication with a computing device, such as a mobile device of an owner of the storage unit. The mobile device may have an application, for instance, that the owner can use to monitor and manage inventory in the storage unit. For instance, the sensor device 202 may include a temperature sensor for monitoring the temperature of the storage unit. The owner may store items that he or she desires to keep below a threshold temperature. The apparatus 200, for instance via the controller 208, can alert the user via a communication device if the storage unit rises above the threshold temperature. Similar, the sensor device 202 may include an RH sensor for monitoring RH levels.

In such an example, the apparatus 200 can be attached to a wall of the storage unit or another location via the adhesion unit 218. For instance, an owner may choose to place the apparatus 200 in a location such that the camera device 212 may monitor statuses of items, and if IR lights or X-ray devices are included, 3-dimensional stacked items and their volume may be monitored and managed. For instance, if the owner stores camping supplies in the storage unit, the camera device 212 may detect when the owner is running low on a particular supply (e.g., firewood) and alert the owner via the application of the low inventory. In some examples, the controller 208 may initiate an order for additional inventory if permitted by the owner. Items with expiration dates may be monitored in some examples, to determine if they should be removed from the storage unit, replaced, or a combination thereof.

Figure 3:
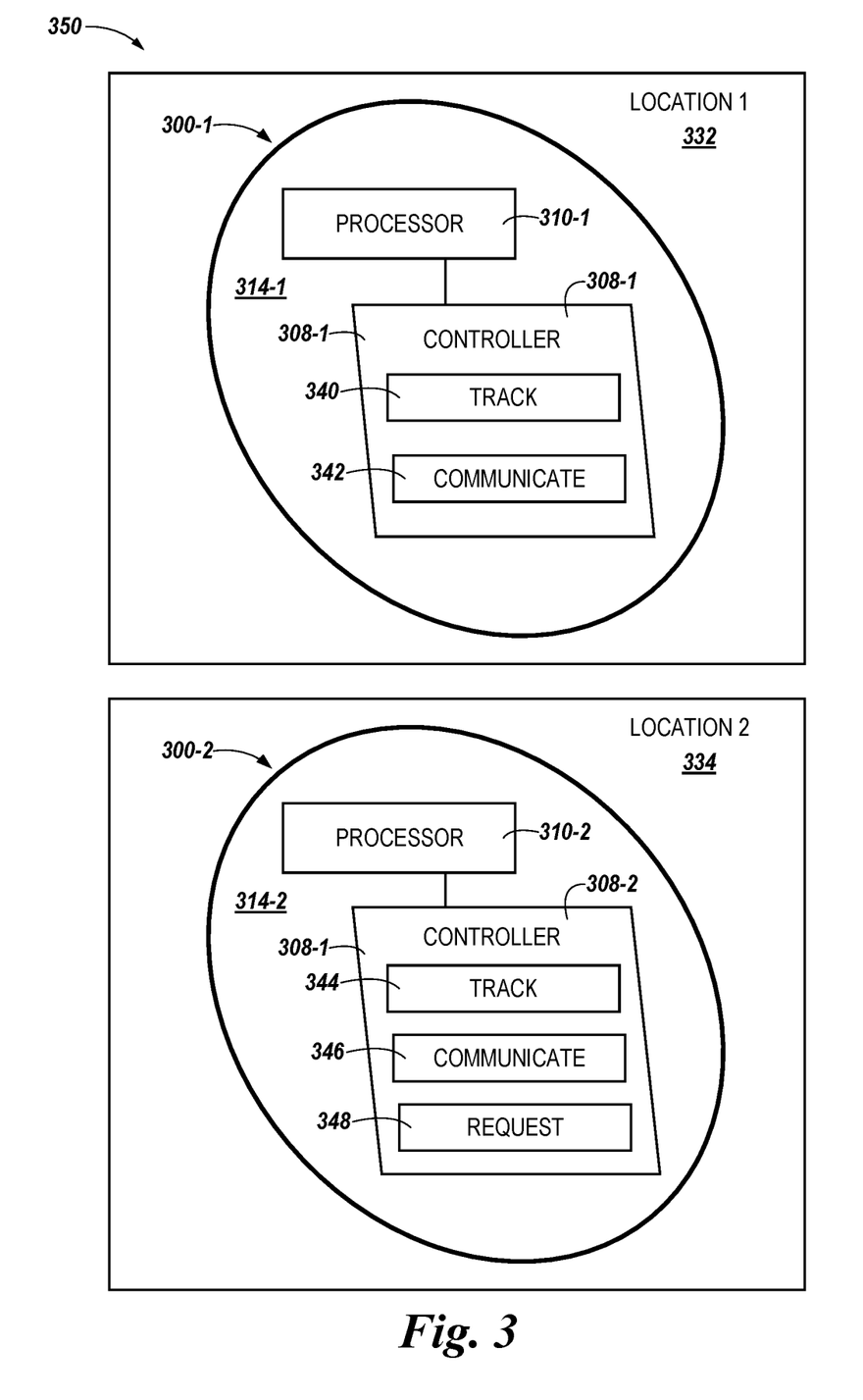
FIG. 3 is a functional block diagram in the form of an example system for inventory management in accordance with a number of embodiments of the present disclosure.

FIG. 3 is a functional block diagram in the form of an example system 350 for inventory management in accordance with a number of embodiments of the present disclosure. The system 350 can include an apparatus 300-1 located in a location 332 ("Location 1") and an apparatus 300-2 located in a location 334 ("Location 2"). The apparatuses 300 can be in communication with one another, as further discussed herein. Different locations can be within a single, larger location (e.g., different locations in one warehouse, different locations within a single refrigerator, etc.) or completely different physical locations (e.g., a warehouse in City A and a warehouse in City B, locations in different buildings, etc.). While two locations 332 and 334 are illustrated in FIG. 3, more than two locations may include apparatuses in communication with one another. Locations, in some examples, can include enclosures such that the location includes an area that is seal off with a natural or artificial barrier. Enclosures, for instance, include refrigerators, closets/pantries, buildings, warehouses, rooms, etc.

The apparatuses 300 can include same or similar elements as those in apparatuses 100 and 200 illustrated in FIGS. 1 and 2, respectively. For instance, at least one of the apparatus 300-1 and the apparatus 300-2 can include a camera device, an access device, a storage device, a sensor device, an adhesion unit, a communication device, a controller 308, a processor 310, a storage device, or a combination thereof. The apparatuses 300 can include more or fewer elements than the apparatuses 100 and 200.

The apparatus 300-1 can include a processor 310-1 coupled to a controller 308-1, and the apparatus 300-2 can include a processor 310-2 coupled to a controller 308-2. In some instances, the apparatus 300-1 and the apparatus 300-2 are packages such as managed memory applications that comprise flexible polymer materials 314-1 and 314-2, respectively. The apparatus 300-1, in some examples, can include a first sensor device located within the interior of Location 1 332. The sensor device can be communicatively coupled to the processor 310-1 and can send signaling to the processor 310-1 regarding the status of Location 1 332. For instance, the sensor device may be a temperature sensor that monitors the location 332 to determine if it rises or falls below a particular temperature. This data can be sent to the processor 310-1. The processor 310-1 can write a data set to a storage device to which the processor 310-1 is coupled that is based at least in part on the signaling from the sensor device.

In some examples, as illustrated at blocks 340 and 342, the controller 308-1 is configured to track inventory information associated with Location 1 332 based at least in part on the first data set written to the storage device and communicate the inventory information associated with the location 332 to the apparatus 300-2. For instance, the controller 308-1 can track inventory information associated with the location 332 using the sensor device, a camera device, or a combination thereof. In such examples, the controller 308-2, as illustrated at blocks 344, 346, and 348, can be configured to track inventory information associated with the location 334, communicate the inventory information associated with the location 334 to the apparatus 300-1, and request inventory from the location 332 based on the communicated inventory information associated with the location 332 and the location 334. Communication, for instance can occur via a communication device such as a radio.

The apparatus 300-2, in some examples, can include a second sensor device located within the interior of Location 2 334. The sensor device can be communicatively coupled to the processor 310-2 and can send signaling to the processor 310-1 or the processor 310-2 regarding the status of Location 2 334. For instance, the sensor device may be a temperature sensor that monitors Location 2 334 to determine if it rises or falls below a particular temperature. This data can be sent to the processor 310-1 or the processor 310-2. The processor 310-1 or the processor 310-2 can write a data set to a storage device to which the processor 310-1 is coupled that is based at least in part on the signaling from the sensor device.

For instance, in a non-limiting example, Location 1 332 may be a storage room in a supply warehouse for a retail store having a store room located in Location 2 334. The apparatus 300-2 may be located on a shelf of a particular merchandise type in the store room at Location 2 334. The controller 300-1 can track inventory information associated with Location 1 332 and communicate the inventory information to the apparatus 300-2. Put another way, the processor 310-1 can identify a quantity or amount of at least one item in Location 1 332. For instance, the controller 300-1 may receive communication from a camera device and/or a sensor device that the storage room (e.g., Location 1 331) has 300 units of the particular merchandise with expiration dates less than a year out and 100 units of the particular merchandise with expirations dates more than a year out. This inventory information can be communicated to the second apparatus (e.g., via the controller 308-2 and/or a communication device) upon request, automatically, periodically, etc.

In the same example, Location 2 334 can include the controller 300-2 configured to track inventory information associated with Location 2 334 and communicate that inventory information to the first apparatus 300-1. The controller 300-2 can request inventory, for instance the particular merchandise, from Location 1 332 (e.g., via the apparatus 300-1) based on the communicated inventory information between the two locations 332, 334. Put another way, the processor 310-2 can identify a quantity or amount of the at least one item in Location 2 334. For instance, the controller 300-2 can receive communication from a camera device, sensor device, or a combination thereof, that the store room is running low of the particular type of merchandise. In response, the controller 300-2 can request the particular type of merchandise from Location 1 332.

Figure 4:
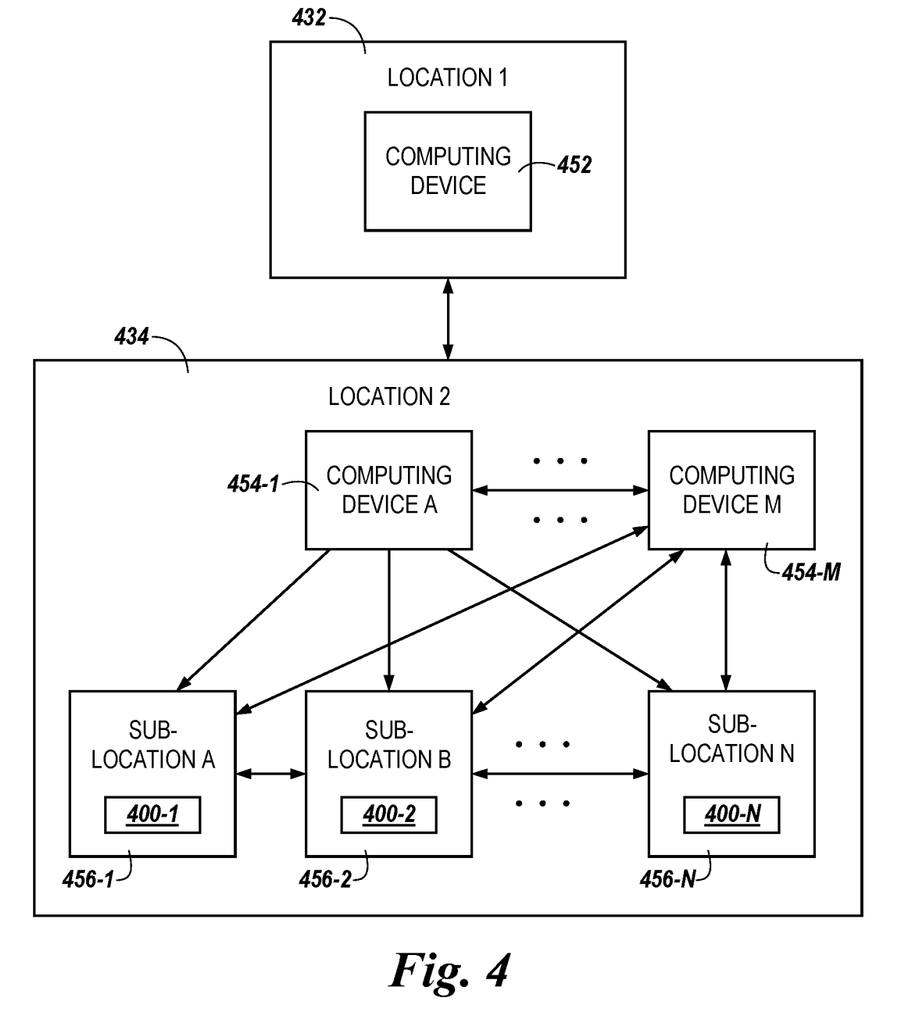
FIG. 4 is another functional block diagram in the form of an example system for inventory management in accordance with a number of embodiments of the present disclosure.

FIG. 4 is another functional block diagram in the form of an example system for inventory management in accordance with a number of embodiments of the present disclosure. FIG. 4 illustrates a location 432 ("Location 1") communicatively coupled to a location 434 ("Location 2"). Location 2 434 includes a plurality of computing devices (e.g., computing device A 454-1, . . . , computing device M 454-M) communicatively coupled to one another. A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

The computing devices 454 can be communicatively coupled to sub-locations within Location 2 434 (e.g., sub-location A 456-1, sub-location B 456-2, . . . , sub-location N 456-N). For instance, a sub-location may be a location within Location 2, such as a shelf, room, appliance, garage, cabinet, etc. located within Location 2. Each sublocation 456 can include an apparatus 400-1, 400-2, . . . , 400-N) that may be analogous to apparatuses 100, 200, 300-1, and/or 300-2 as illustrated in FIGS. 1-3. The computing devices 454 can receive inventory information about the sub-locations 456, and in some instances, one or more of the computing devices 454 can communicate inventory information to the computing device 452.

In a non-limiting example, the system of FIG. 4 may include a household management system. For instance, the sub-locations 456 may include locations around a house such as a refrigerator, pantry, medicine cabinet, garage, master bedroom closet, laundry room, backpack, office, wine storage, bathroom, child's closet, etc. The computing devices 454 can include computing devices belonging to members of the household (e.g., smartphones, tablets, laptops, etc.) having an application thereon to manage household inventory information. Each computing device 454 can receive inventory information associated with a sub-location 456 via an apparatus 400 located in the sub-location.

For example, an apparatus 400-1 may be located in a refrigerator. The apparatus can track inventory information associated with the refrigerator using a camera device, IR light, X-ray devices, scent sensors, temperature sensors, etc. In some instance, the apparatus 400-1 may include a UVC light device to destroy bacteria viruses, and/or harmful microbes on inventory contents. The controller can receive inventory information related to expirations dates, shelf life, rotting food, content in open containers, etc., and can provide the computing devices 454 with alerts regarding the status of the inventory. Similar, the apparatus 400-1 may provide suggestions for meals based on food in the refrigerator (e.g., and food in the pantry). The apparatus 400-1 can provide to the computing devices 454 suggestions for ordering/purchasing new items and can order the items upon request or as a programmed setting. For instance, the apparatus 400-1 may scan barcodes upon detection of a new item and store inventory information (e.g., expiration dates) to use when providing alerts and suggestions to the computing devices 454. The apparatus 400-1, in some instances, may learn the household's eating habits (e.g., learn inventory patterns via AI) and suggest purchases prior to an inventory item running out.

Other apparatuses 400 may learn the household's inventory patterns, for instance using AI. For instance, the apparatuses 400 may learn item usage, budgets, proximity to stores, prescriptions, personal preferences, etc., and consider these patterns when making suggestions, placing orders, etc.

In an example in which the sub-location is a medicine cabinet, an apparatus, for instance apparatus 400-2, can check for available medicine, make suggestions for usages of medicines, track expiration devices, provide side effects and risks of medications, or a combination thereof to the computing devices 454.

In some examples, the apparatuses 456 can store records of tracked items such that they can be located using the computing devices 454. For instance, a shirt or other clothing item may be identified by a camera device of an apparatus 400 in the laundry room. This can be tracked to a child's bedroom through communication between the apparatuses 400 of the sublocations 456. When a child is looking for the shirt, he or she can check the application on his or her computing device 454 to locate the shirt. In another example, car keys may be tracked using apparatuses 400, and locations can be communicated to the computing devices 454. Examples are not limited to the items discussed above and may include other items in a household of which tracking may be desired.

In some examples, the apparatuses 400 can update overall inventory lists, which may be accessed via the computing devices 454. For instance, the apparatuses can inventory all detected bug spray bottles and update as the number of bug spray bottles changes. In some instance, inventory scans by the apparatuses 400 can be made continuously such that updates are made in real-time, or inventory scans can be made periodically (e.g., scheduled daily, weekly, monthly, etc.).

In the non-limiting example, the computing device 452 may belong to an extended family member. For instance, if family members in Location 2 434 are not able to leave their home due to a natural disaster, etc., or if family members in Location 2 434 are elderly and need assistance, inventory information associated with Location 2 434 can be shared with the computing device 452 at Location 1 432, such that the extended family member can pick up medicine (e.g., if the apparatus 400-2 indicates a particular medication is low), order groceries, etc. Information available between computing devices 454 and 452 may be password-protected, encrypted, or a combination thereof.

In other examples, Location 1 432 may be an inventory office, and the computing device 452 may belong to an ordering manager for a warehouse. Location 2 434 may be the warehouse, with sub-locations 456 throughout the warehouse. The computing devices 454 may be used by workers in the warehouse, and the workers can track and manage inventory using the computing device and inventory information received from the apparatuses 400. The inventory information can be communicated to the computing device 452, for instance, when an ordering manager needs to place a new order for a particular item.

Figure 5:
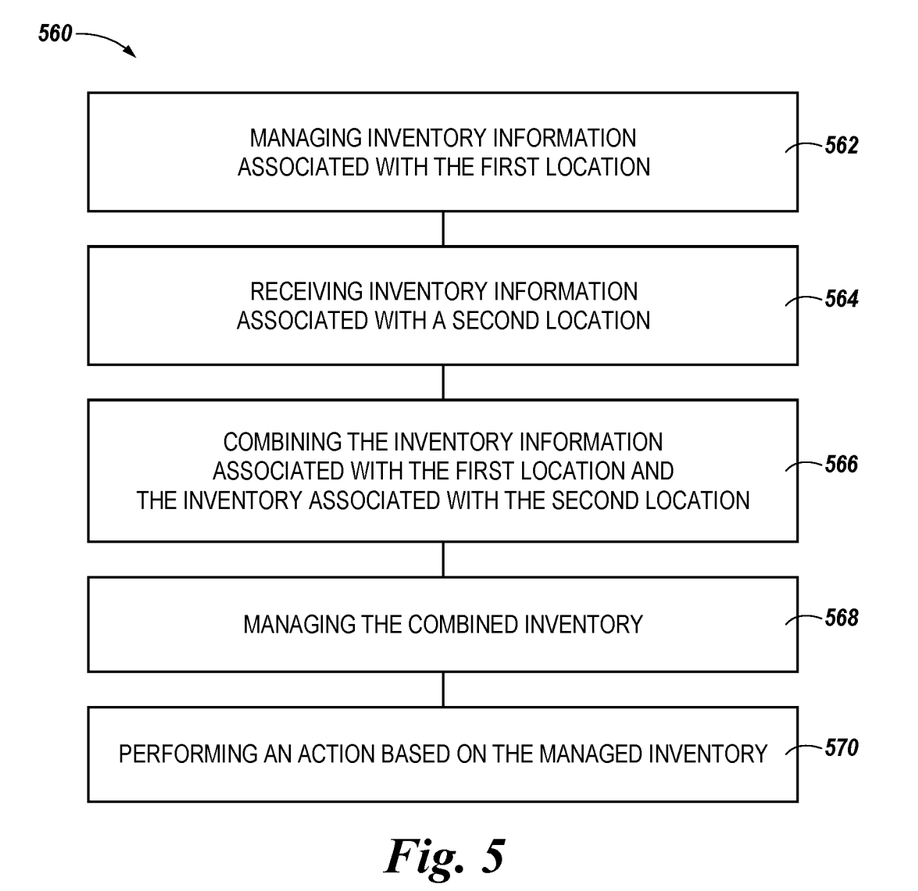
FIG. 5 is a flow diagram representing an example method for inventory management in accordance with a number of embodiments of the present disclosure.

FIG. 5 is a flow diagram representing an example method 560 for inventory management in accordance with a number of embodiments of the present disclosure. The method 560 can be performed by a system or controller, such as the systems described with respect to FIGS. 3 and 4 or the controllers described with respect to FIGS. 1 and 2.

At 562, the method 560 can include managing, at a controller in a first location, inventory information associated with the first location. For example, managing inventory information associated with the first location can include managing inventory information received at the controller in the first location from a sensor device, a camera device, or a combination thereof in the first location communicatively coupled to the controller in the first location. For instance, the controller can receive inventory information about temperature, expiration dates, humidity, content, numbers, etc. from the sensor device and/or the camera device.

For example, managing inventory information associated with the first location can include monitoring environmental information associated with the first location. The inventory may be temperature-dependent (e.g., perishable), and the controller can receive information from a temperature sensor and use that information to manage the inventory. For instance, an alert can be sent out if the temperature rises above a particular threshold, or a thermostat in the location may be automatically turned down.

In some examples, managing the inventory information associated with the first location can include learning inventory patterns using AI. For instance, the controller may learn that a particular inventory type depletes at a higher rate at the end of the month. For instance, user habits over time may indicate that purchase orders for the particular inventory type increase near the end of the month, allowing for inventory patterns to be learned using AI based on user habits over time. Based on this learned behavior the controller may suggest preventative and/or alternative options such as ordering ahead of this time frame to manage the inventory such that it does not run out. Another option may be searching associated inventory, for instance at an associated location, as will be discussed further herein, for additional inventory.

At 564, the method 560 can include receiving, at the controller in the first location, inventory information associated with a second location. For instance, the inventory information associated with the second location can be received from a sensor device located in the second location. In a non-limiting example, the second location may be an associated business. For instance, the first location may be a first library within a library system, and the second location may be a second, different library within the same library system. The second library may send inventory information associated with a particular book to the first library, for instance. Another example may include a first location of a retail store as the first location and a second location of the same retail store as a second location. Alternatively, the second location may be a supplier and/or warehouse of the retail store. The first and second locations may communication information regarding clothing, accessories, etc. to one another.

The method 560, at 566, can include combining the inventory information associated with the first location and the inventory associated with the second location, and at 568, the method 560 can include managing the combined inventory. For instance, managing the combined inventory includes determining inventory contents of the first location and inventory contents of the second location and comparing the inventory contents of the first location and the inventory contents of the second location. In the library example, the first and second libraries may determine which books they have available at each location and determine if some books should be moved to other locations. In the retail example, the first and second locations may determine which items are available to customers and if any overstocked items should be moved to other locations. For instance, the first location may have no blue pants, but the second location may have an excess number of blue pants.

At 570, the method 560 can include performing an action based on the managed memory. Performing the action can include, for instance, the controller in the first location requesting inventory from the second location (e.g., from a controller in the second location). For instance, the first library may be out of Book A, and may request one or more copies of Book A from the second location if the combined inventory information indicates the second location has a surplus of Book A. In some examples, performing the action includes providing an inventory recommendation associated with the first location, the second location, or a combination thereof. For instance, if during inventory management, it is determined that neither location has a sufficient number of copies of Book A, a recommendation can be made to order more copies or request copies from other locations. In the retail example, actions can include notifying other locations of excess inventory, requesting or ordering inventory, providing recommendations of when to order particular inventory, etc.

Figure 6:
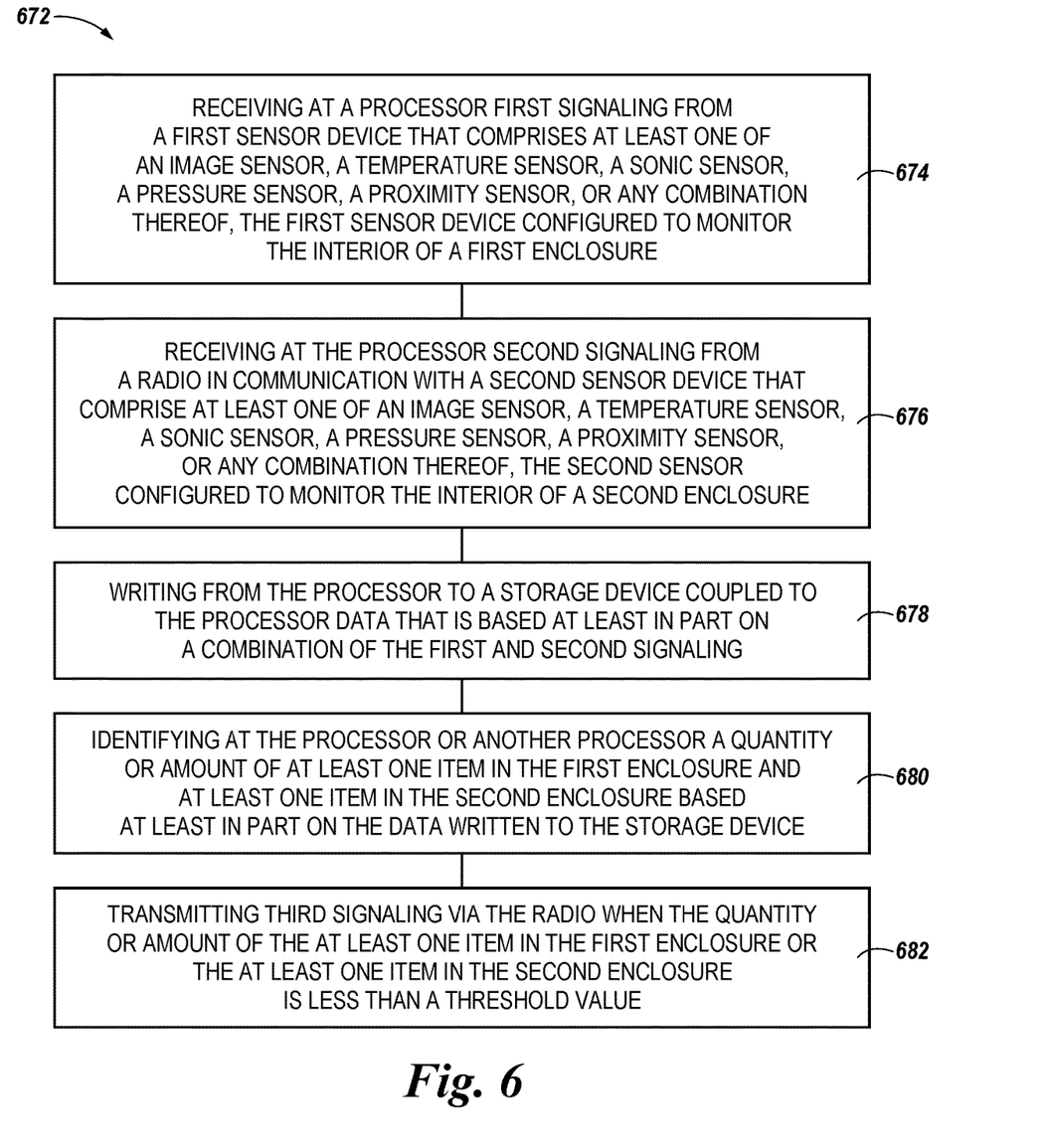
FIG. 6 is a flow diagram representing another example method for inventory management in accordance with a number of embodiments of the present disclosure.

FIG. 6 is a flow diagram representing another example method 672 for inventory management in accordance with a number of embodiments of the present disclosure. The method 672 can be performed by a system or controller, such as the systems described with respect to FIGS. 3 and 4 or the controllers described with respect to FIGS. 1 and 2.

At 674, the method 672 can include receiving at a processor first signaling from a first sensor device that comprises at least one of an image sensor, a temperature sensor, a sonic sensor, a pressure sensor, a proximity sensor, or any combination thereof, the first sensor device configured to monitor the interior of a first enclosure. Receiving the first signaling, for instance, can include receiving inventory information associated with the first enclosure.

The first signaling can include wired or wireless communication, for instance, with the processor. The interior of a first enclosure, for instance, can include the interior of a first location such as a refrigerator, a warehouse, or some other enclosed located. A sensor device or sensor devices may be located within the interior of the first enclosure to monitor the interior of the first enclosure. For instance, a temperature or other environmental sensor may monitor how warm, cool, or humid the refrigerator or the warehouse is, and/or an image sensor may visually monitor food in the refrigerator for spoilage or boxes in the warehouse for damage. Other monitoring may occur by the same or different sensor devices.

At 676, the method 672 can include receiving at the processor second signaling from a radio in communication with a second sensor device that comprise at least one of an image sensor, a temperature sensor, a sonic sensor, a pressure sensor, a proximity sensor, or any combination thereof, the second sensor configured to monitor the interior of a second enclosure. Receiving the first signaling, for instance, can include receiving inventory information associated with the first enclosure. The second signaling can include wired or wireless communication received at the processor via a radio or other communication device from the second sensor device. For instance, the radio may be communicatively coupled to the processor.

The interior of a second enclosure, for instance, can include the interior of a second location such as a restaurant pantry, a different warehouse, or some other enclosed located. A sensor device or sensor devices may be located within the interior of the second enclosure to monitor the interior of the second enclosure. For instance, a proximity sensor may monitor how full the restaurant pantry or the different warehouse is, and/or a pressure sensor may monitor weight of items food in the restaurant pantry or boxes in the different warehouse for inventory purposes. Other monitoring may occur by the same or different sensor devices.

At 678, the method 672 can include writing from the processor to a storage device coupled to the processor data that is based at least in part on a combination of the first and second signaling. For instance, in the example above, data received at the processor about the refrigerator, the warehouse, the restaurant pantry, or the different warehouse may be combined and written to the storage device.

The method 672, at 680, can include identifying at the processor or another processor a quantity or amount of at least one item in the first enclosure and at least one item in the second enclosure based at least in part on the data written to the storage device. For example, in the above example, the processor or another processor may determine how much food is in the refrigerator or restaurant pantry (e.g., 10 gallons of milk in the refrigerator, 20 boxes of cereal in the restaurant pantry, etc.) and/or how many of a particular box (e.g., product) is in each of the warehouse and the different warehouse.

At 682, the method 672 can include transmitting third signaling via the radio when the quantity or amount of the at least one item in the first enclosure or the at least one item in the second enclosure is less than a threshold value. For example, the third signaling can include a request from the processor for the at least one item to be transferred to the first enclosure from the second closure when the quantity or amount is less than the threshold value in the first enclosure and a request from the processor for the at least one item to be transferred to the second enclosure from the first closure when the quantity or amount is less than the threshold value in the second enclosure. Put another way, in the warehouse example, if it is determined that the different warehouse (second enclosure) has two boxes of a particular type, which is below a desired threshold of three boxes of that particular type, third signaling can include a request to the warehouse (first enclosure) to send additional boxes to the different warehouse, if available.

In some examples, the processor and/or a controller to which it is communicatively coupled, can learn inventory patterns using AI. For instance, inventory patterns may include how quickly the particular box type is used up in the warehouse or the different warehouse, what days of the week or month or year an item in the restaurant pantry is used more often, where the most efficient orders come from, which items in the refrigerator expire faster than others, how much lead time is needed before ordering an item, which customers order items at which time, determine which items are most likely to become overstocked, etc.

In some instances, using the data written to the storage device, an inventory recommendation associated with the at least one item in the first enclosure, the second enclosure, or a combination thereof can be made. For example, inventory contents of the first enclosure including the at least one item and inventory contents of the second enclosure including the at least one item can be determined. The inventory contents of the first and the second enclosures can be compared, and a recommendation can be made. In the warehouse example, for instance, depending on how many of the particular box type is available in each warehouse, a recommendation can be made to order more of the particular box type to one of the warehouses and/or delay an order to one of the warehouses.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    receiving at a processor of a first package of a household management system comprising the processor, a controller, and a plurality of sensor devices, first signaling from a first sensor device of the plurality of sensors within the household management system that comprises at least one of an image sensor, a temperature sensor, a sonic sensor, a pressure sensor, a proximity sensor, or any combination thereof, the first sensor device configured to monitor the interior of a first enclosure;
    receiving at the processor second signaling from a radio in communication with a second sensor device of a second package of the household management system, the second sensor device comprising at least one of an image sensor, a temperature sensor, a sonic sensor, a pressure sensor, a proximity sensor, or any combination thereof, the second sensor device configured to monitor the interior of a first sublocation of a second enclosure, wherein the first sublocation is a first location within a house monitored with the household management system;
    receiving at the processor third signaling from a radio in communication with a third sensor device of a third package of the household management system, the third sensor device comprising at least one of an image sensor, a temperature sensor, a sonic sensor, a pressure sensor, a proximity sensor, or any combination thereof, the second sensor device configured to monitor the interior of a second sublocation of the second enclosure,
        wherein the second sublocation is a second location within the house monitored with the household management system;
    writing from the processor to a storage device coupled to the processor, inventory information that is based at least in part on a combination of the first, the second, and the third signaling;
    identifying at the processor or another processor, a quantity or amount of at least one item in the first enclosure and at least one item in the first sublocation or the second sublocation of the second enclosure based at least in part on the inventory information written to the storage device;
    transmitting fourth signaling via the radio when the quantity or amount of the at least one item in the first enclosure or the at least one item in the first sublocation or the second sublocation of the second enclosure is less than a threshold inventory value;
    tracking the inventory information, wherein the inventory information comprises inventory contents of the first enclosure and the first sublocation of the second enclosure, the second sublocation of the second enclosure, environmental information associated with the first enclosure, the first sublocation of the second enclosure, and the second sublocation of the second enclosure, and inventory patterns of the first enclosure, the first sublocation of the second enclosure, and the second sublocation of the second enclosure;
    managing the inventory information associated with the first enclosure and the inventory information associated with the first sublocation of the second enclosure and the second sublocation of the second enclosure, wherein managing the inventory comprises:
        the controller adjusting a first temperature of the first enclosure or a second temperature of the first sublocation of the second enclosure or the second sublocation of the second enclosure responsive to the first temperature, the second temperature, or both falling outside of a temperature threshold;
        the controller initiating an order for first additional inventory based on the inventory contents falling below the threshold inventory value; and
        the controller initiating an order for second additional inventory based on a portion of the inventory contents reaching a threshold time from expiration determined using information gathered by the first sensor device, the second sensor device, the third sensor device, or a combination thereof;
    sharing and requesting inventory updates associated with the first enclosure and the first sublocation of the second enclosure and the second sublocation of the second enclosure with a computing device located in a different location and communicatively coupled to the first and the second packages based on the managed inventory information; and
    receiving the inventory updates in real time responsive to continuous inventory scans.

2. The method of claim 1, wherein receiving at the processor the first signaling comprises receiving environmental information associated with the first enclosure.

3. The method of claim 1, wherein the fourth signaling comprises:
    a request from the processor for the at least one item to be transferred to the first enclosure from the second enclosure when the quantity or amount is less than the threshold inventory value in the first enclosure; and
    a request from the processor for the at least one item to be transferred to the second enclosure from the first enclosure when the quantity or amount is less than the threshold inventory value in the second enclosure.

4. The method of claim 1, further comprising the processor learning the inventory patterns using artificial intelligence (AI).

5. The method of claim 1, further comprising providing an inventory recommendation associated with the at least one item in the first enclosure, the second enclosure, or a combination thereof.

6. The method of claim 1, further comprising receiving at the processor second signaling from a radio in communication with the second sensor device, wherein the second sensor device is located within the interior of the second enclosure.

7. The method of claim 1, further comprising receiving at the processor first signaling from the first sensor device, wherein the first sensor device is located within the interior of the first enclosure.

8. The method of claim 1, further comprising:
determining inventory contents of the first enclosure including the at least one item and inventory contents of the second enclosure including the at least one item; and
comparing the inventory contents of the first enclosure and the inventory contents of the second enclosure.

9. The method of claim 1, wherein:
receiving at the processor the first signaling comprises receiving inventory information associated with the first enclosure; and
receiving at the processor the second signaling comprises receiving inventory information associated with the second enclosure.

10. A household management system, comprising:
a first package located in a first location within a house monitored with the household management system, comprising:
　a first plurality of sensor devices located within the interior of the first location and configured to monitor the interior of the first location;
　a first processor communicatively coupled to a first sensor device of the first plurality of sensor devices to:
　　receive first signaling from the first sensor device, wherein the first sensor device comprises at least one of an image sensor, a temperature sensor, a sonic sensor, a pressure sensor, a proximity sensor, or any combination thereof; and
　　write to a storage device coupled to the first processor inventory information that is based at least in part on the first signaling;
　a first controller coupled to the first processor and configured to:
　　track the inventory information associated with the first location, wherein the inventory information associated with the first location comprises inventory contents of the first location, environmental information associated with the first location, and inventory patterns of the first location;
　　manage the inventory information associated with the first location, wherein managing the inventory comprises:
　　　the first controller adjusting a first temperature of the first location responsive to the first temperature falling outside of a first temperature threshold; and
　　　the first controller initiating an order for additional inventory based on the inventory contents of the first location falling below a first threshold inventory value; and
　　share and request inventory updates associated with the first location with a computing device located in a different location and communicatively coupled to the first package based on the managed inventory information associated with the first location;
a second package located in a second location within the house monitored with the household management system, communicatively coupled to the first package, and comprising:
　a second plurality of sensor devices located within the interior of the second location and configured to monitor the interior of the second location;
　a second processor communicatively coupled to a second sensor device of the second plurality of sensor devices to:
　　receive second signaling from the second sensor device, wherein the second sensor device comprises at least one of an image sensor, a temperature sensor, a sonic sensor, a pressure sensor, a proximity sensor, or any combination thereof; and
　　write to the storage device inventory information that is based at least in part on the second signaling;
　a second controller coupled to the second processor and configured to:
　　track the inventory information associated with the second location, wherein the inventory information associated with the second location comprises inventory contents of the second location, environmental information associated with the second location, and inventory patterns of the second location;
　　manage the inventory information associated with the second location, wherein managing the inventory comprises:
　　　the second controller adjusting a second temperature of the second location responsive to the second temperature falling outside of a second temperature threshold; and
　　　the second controller initiating an order for additional inventory based on the inventory contents of the second location falling below a second threshold inventory value;
　　share and request inventory updates associated with the second location with the computing device located in the different location and communicatively coupled to the second package based on the managed inventory information associated with the second location;
a third package located in a third location within the second location, communicatively coupled to the first package and the second package, and comprising:
　a third plurality of sensor devices located within the interior of the third location and configured to monitor the interior of the third location;
　a third processor communicatively coupled to a third sensor device of the third plurality of sensor devices to:
　　receive third signaling from the third sensor device, wherein the third sensor device comprises at least one of an image sensor, a temperature sensor, a sonic sensor, a pressure sensor, a proximity sensor, or any combination thereof; and
　　write to the storage device inventory information that is based at least in part on the third signaling;
　a third controller coupled to the third processor and configured to:
　　track the inventory information associated with the third location, wherein the inventory information associated with the third location comprises inventory contents of the third location, environmental information associated with the third location, and inventory patterns of the third location;

manage the inventory information associated with the third location, wherein managing the inventory comprises:

the third controller adjusting a third temperature of the third location responsive to the third temperature falling outside of a third temperature threshold; and the third controller initiating an order for additional inventory based on the inventory contents of the third location falling below a third threshold inventory value;

share and request inventory updates associated with the third location with the computing device located in the different location and communicatively coupled to the third package based on the managed inventory information associated with the third location; and the first controller initiating an order for additional inventory based on a portion of the inventory contents reaching a threshold time from expiration determined using information gathered by the first sensor device, the second sensor device, the third sensor device, or a combination thereof.

11. The system of claim 10, wherein the first package, second package, and the third package comprise a flexible polymer material.

12. The system of claim 10, further comprising the first processor configured to identify a quantity or amount of at least one item in the first location and the second processor configured to identify a quantity or amount of the at least one item in the second location.

13. The system of claim 10, wherein at least one of the first package and the second package further comprises a DRAM access device and a NAND storage device, or a combination thereof.

14. The system of claim 10, further comprising the first controller and the second controller configured to learn the inventory patterns using artificial intelligence (AI).

15. A household management apparatus, comprising:

a plurality of sensor devices located within the interior of a plurality of locations within the household location and configured to monitor each interior of each of the plurality of locations;

a plurality of processors communicatively coupled to a sensor device of the plurality of sensor devices, each one of the plurality of processors to:

receive signaling from each respective sensor device of the plurality of sensor devices, wherein the sensor device comprises at least one of an image sensor, a temperature sensor, a sonic sensor, a pressure sensor, a proximity sensor, or any combination thereof; and write to a storage device coupled to [each respective processor of the plurality of processors inventory information that is based at least in part on the signaling;

a plurality of controllers coupled to the plurality of processors, each of one of the plurality of controllers configured to:

track the inventory information, wherein the inventory information comprises inventory contents of the location, environmental information associated with the location, and inventory patterns of the location;

manage the inventory information, wherein managing the inventory comprises:

each respective controller of the plurality of controllers adjusting a temperature of the location responsive to the temperature falling outside of a temperature threshold; and each respective controller initiating an order for first additional inventory based on the inventory contents falling below a threshold inventory value;

each respective controller initiating an order for second additional inventory based on a portion of the inventory contents reaching a threshold time from expiration determined using information gathered by the plurality of sensor devices; and share and request inventory updates associated with the location with a computing device located in a different location and communicatively coupled to the apparatus based on the managed inventory information.

16. The apparatus of claim 15, wherein an additional sensor device of the plurality of sensor devices is a relative humidity sensor, a temperature sensor, a weight sensor, a light sensor, or a combination thereof.

17. The apparatus of claim 15, wherein the inventory patterns of the location are learned using artificial intelligence (AI).

18. The apparatus of claim 15, wherein the storage device is a NAND device.

19. The apparatus of claim 15, wherein each respective controller configured to manage the inventory information further comprises each respective controller configured to share and request inventory updates associated with the location and the different location with a different processor located in the different location and communicatively coupled to the apparatus.

20. The apparatus of claim 15, wherein each respective controller is a microcontroller.

* * * * *